United States Patent
Lin et al.

(10) Patent No.: US 6,570,892 B1
(45) Date of Patent: May 27, 2003

(54) PASSIVELY MODE-LOCKED FIBER LASERS

(75) Inventors: Hong Lin, Palo Alto, CA (US); Katherine Y. Lin, Mountain View, CA (US)

(73) Assignee: Calmar Optcom, Inc., Mountain View, CA (US)

(*) Notice: Subject to any disclaimer, the term of this patent is extended or adjusted under 35 U.S.C. 154(b) by 0 days.

(21) Appl. No.: 10/123,942

(22) Filed: Apr. 16, 2002

Related U.S. Application Data

(63) Continuation of application No. 09/575,675, filed on Jun. 21, 2000, now Pat. No. 6,373,867, which is a continuation of application No. 09/025,080, filed on Feb. 17, 1998, now Pat. No. 6,097,741.
(60) Provisional application No. 60/052,295, filed on Jul. 11, 1997.

(51) Int. Cl.[7] .............................................. H01S 3/098
(52) U.S. Cl. ............................................. 372/6; 372/18
(58) Field of Search ................................ 372/6, 18, 75, 372/98; 359/179

(56) References Cited

U.S. PATENT DOCUMENTS

| | | | |
|---|---|---|---|
| 5,008,887 A | 4/1991 | Kafka et al. ................. | 372/6 |
| 5,367,531 A | * 11/1994 | Eguchi ......................... | 372/98 |
| 5,436,925 A | 7/1995 | Lin et al. | |
| 5,440,573 A | * 8/1995 | Fermann ..................... | 372/18 |
| 5,488,620 A | 1/1996 | Minden | |
| 5,513,194 A | 4/1996 | Tamura et al. .............. | 372/6 |
| 5,530,582 A | 6/1996 | Clark ........................... | 359/333 |
| 5,617,434 A | 4/1997 | Tamura et al. .............. | 372/6 |
| 5,627,848 A | * 5/1997 | Fermann ..................... | 372/18 |
| 6,097,741 A | * 8/2000 | Lin et al. ..................... | 372/6 |
| 6,373,867 B1 | * 4/2002 | Lin et al. ..................... | 372/18 |

OTHER PUBLICATIONS

"A Turnkey 1.5 $\mu$m Picosecond Er/Yb Fiber Laser" K. V. Reddy, et al., Amoco Technology Company, pp. 71–74.
"Adjustment–free femtosecond polarization–maintaining fiber lasers", Hong Lin, et al., OFC '97 Technical Digest, pp. 165–166.
"Saturable Absorber Modelocked Polarisation Maintaining Erbium–Doped Fibre Laser", E.A. De Souza, et al., Electronics Letters, Mar. 4th, 1993, vol. 29, No. 5, pp. 447448.
Lin et al., Saturable Absorber Mode–Locked Er/Yb Fiber Ring Lasers, ECOC European Conference of Optical Communications, pp1–4 (1995).
Reddy et al., A Turnkey 1.5 $\mu$m Picosecond Er/Yb Fiber Laser, Optical Fiber Communication Conference, pp. 71–74 (1993).
Lin et al., Adjustment –free femtosecond polarization–maintaining fiber lasers, Technical Digest, pp. 165–166 (1997).
Souza et al., Saturable Absorber Nodelocked Polirazation Maintaing Erbium–Doped Fibre Laser, Electronic Letters, vol. 29 No. 5 pp. 447–448.

* cited by examiner

*Primary Examiner*—Paul Ip
*Assistant Examiner*—Gioacchino Inzirillo
(74) *Attorney, Agent, or Firm*—Fish & Richardson P.C.

(57) ABSTRACT

A passive mode-locked linear-resonator fiber laser using polarization-maintaining fibers and a saturable absorber to produce ultra short pulses and a long-term reliable operation with reduced maintenance. Such a fiber laser can be configured to produce tunable pulse repetition rate and tunable laser wavelength.

20 Claims, 11 Drawing Sheets

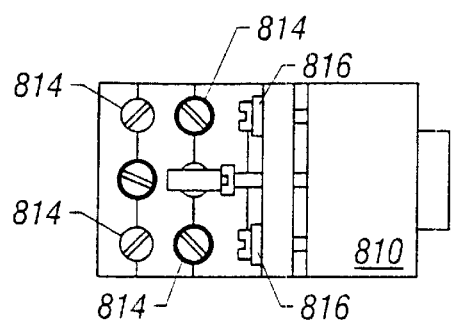
FIG. 8B
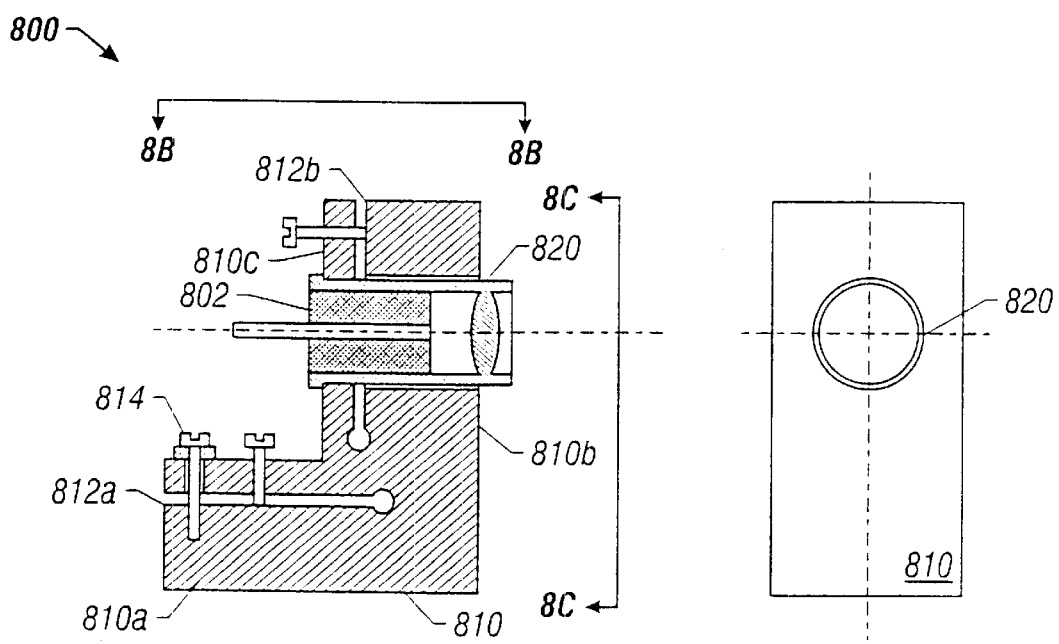
FIG. 8A  FIG. 8C

PASSIVELY MODE-LOCKED FIBER LASERS

This application is a continuation of U.S. application Ser. No. 09/575,675 filed Jun. 21, 2000 now U.S. Pat. No. 6,373,867, which is a continuation of U.S. application Ser. No. 09/025,080 filed Feb. 17, 1998 now U.S. Pat. No. 6,097,741, which claims the benefit of U.S. Provisional Application No. 60/052,295 filed on Jul. 11, 1997. The disclosures of the above applications are incorporated herein by reference as part of this application.

FIELD OF THE INVENTION

The present invention relates to fiber optical devices and lasers, and more specifically, to mode-locked fiber lasers.

BACKGROUND OF THE INVENTION

Ultra short optical pulses can be used in a number of applications including optical information processing and data communication, optical probing with high temporal resolution, laser surgery, and material processing. In particular, recent advances in optical data communication with data rates up to 2.5 Gbits/s or higher demand compact ultra fast light sources with low maintenance, high reliability, and low cost.

Fiber lasers have been developed as a new generation of compact, inexpensive and robust light sources. In essence, a fiber laser is an optically-pumped resonator with a doped-fiber as the gain medium. As the gain exceeds the total optical loss in the resonator, a laser oscillation can be generated. Many different dopants can be used to achieve laser oscillations at different wavelengths. Atomic transitions in rare-earth ions can be used to produce lasers from visible wavelengths to far infrared wavelengths (e.g., 0.45 $\mu$m~3.5 $\mu$m). Er-doped fiber lasers for producing optical pulses at 1.55 $\mu$m are particularly useful for optical fiber communication since the optical loss in the commonly used silica fibers is minimum at about 1.55 $\mu$m.

Mode-locked fiber lasers can use various cavity configurations such as linear, ring, and figure-eight geometries. See, for example, U.S. Pat. No. 5,008,887 to Kafka et al., U.S. Pat. No. 5,513,194 to Tamura et al. However constructed, a mode-locked fiber laser is configured to have multiple longitudinal modes that oscillate simultaneously. A mode-locking mechanism is implemented in the resonator to synchronize the phases of different modes in such a way that the phase difference between any two adjacent modes is a constant. These phase-locked modes constructively add to one another to produce a short pulse.

Two common mode-locking schemes are active mode locking and passive mode locking. Active mode locking modulates either the amplitude or the phase of the intracavity optical field at a frequency equal to one or a multiplicity of the mode spacing. Active mode locking can be implemented by using intracavity electrooptic and acoustooptic modulators.

Alternatively, passive mode locking uses at least one nonlinear optical element inside the resonator to produce an intensity-dependent response to an optical pulse so that the pulse width of the optical pulse exiting the nonlinear element is reduced. Compared to active mode locking, passive mode locking can be used to achieve shorter pulses and therefore can be used advantageously to produce ultra short light sources. Commonly used passive mode locking techniques include saturable absorbers, nonlinear fiber-loop mirrors (e.g., figure eight fiber lasers), and intensity-dependent nonlinear polarization rotation. See, Richardson et al., Electronic Letters, Vol. 1, pp. 542, 1991 and Tamura et al., Electronic Letters, Vol. 28, 2226, 1992.

Mode-locked fiber lasers are much more compact and reliable than solid-state mode-locked lasers such as color-center lasers and Ti-Sapphire lasers. Compared to mode-locked semiconductor lasers with typical pulse widths of 10–20 ps and peak power of milliwatts, mode-locked fiber lasers can generate shorter pulses with higher output peak power.

SUMMARY OF THE INVENTION

The present disclosure describes a passive mode-locked fiber laser with a simple linear cavity and a saturable absorber to generate femtosecond pulses with a peak power up to and greater than tens of watts.

A mode-locked fiber laser of the invention generally includes an optical resonator defined by first and second optical reflective elements, a pump light source which provides a pump beam at a selected pump wavelength or within a specified pump spectral range, a doped fiber gain medium disposed in the resonator responsive to the pump beam to produce an optical gain at a laser wavelength within a laser gain spectral range, a pump optical coupler disposed to couple the pump beam into the doped fiber, and a saturable absorber disposed relative to the second reflective element that produces an intensity-dependent absorption at the laser wavelength.

The doped fiber gain medium and other fiber links within the resonator are preferably made of polarization-maintaining or polarizing fibers that are aligned with one another along a polarization axis. This keeps the laser polarization parallel to a principal axis of the fibers without using additional polarization controlling devices. This polarization-maintaining configuration simplifies the construction of the resonator and allows for a reliable long-term laser operation without need for polarization maintenance.

The saturable absorber preferably exhibits a slow saturation process and a fast saturation process. The slow saturation process has a low saturation intensity and can be used to initiate mode locking when the intracavity intensity fluctuates at a low power level. As the pulse intensity builds up, the pulse width can be further reduced by the fast saturation process. The slow saturation process allows use of long-lasting low-power semiconductor light-emitting devices such as LEDs and laser diodes as the pump light source to achieve a reliable operation up to the life time of these light sources. Many semiconductor compounds have such slow and fast saturation processes that are originated from inter-band and intra-band transitions and can be used to implement the invention.

The pump light source may include a light-emitting element such as a LED and a laser diode to produce pump light at one or more pump wavelength in resonance with at least one optical transition in the doped fiber gain medium for producing photons at the laser wavelength. The light-emitting element can be electrically controlled to produce an adjustable output power.

The pump optical coupler may include a wavelength-division multiplexer that couples the pump light into the doped fiber gain medium. The pump light is preferably coupled into the resonator to propagate in a direction away from the saturable absorber to reduce the amount of the pump light into the saturable absorber, thus reducing any optical damage to the absorber by the pump light.

Wavelength-selective optical elements such as gratings and bandpass filters can be incorporated into the resonator to effect a frequency tuning mechanism. This produces tunable ultra short optical pulses within the gain spectral profile of the doped fiber medium.

A mechanism for tuning the pulse repetition rate can be further included by changing the optical length of the resonator in a controllable manner. A fiber stretcher or a positioner may be used for this purpose. In addition, a feedback loop may be implemented to lock the pulse repetition rate to an external clock. A portion of the output pulses is detected by a photodetector. An error signal can be electronically generated to indicate the relative delay of the pulse rate and the external clock rate. A control circuit sends a control signal to adjust the length of the resonator by, for example, changing the position of the first reflective element, to reduce this error signal.

A fiber laser in accordance with the invention may be configured to produce either transform-limited soliton pulses or non-soliton pulses. The soliton operation can be achieved by adjusting the cavity parameters so that the group-velocity dispersion and the nonlinear self-phase modulation balance each other. Conversely, the laser may be adjusted to produce non-soliton pulses as desired.

In addition, a fiber laser in according to the invention can be configured to significantly reduce noise and timing jitter in the output pulses. Implementation of the polarization-maintaining configuration can reduce or minimize the noise and jitter caused by variations in the light polarization. The reflection at the pump wavelength within the resonator can be reduced or minimized by using anti-reflection coating at the pump wavelength on any optical surface, using angle-polished fiber facets, or using bandpass filtering elements that block light at the pump wavelength.

One advantage of the invention is the simplicity of the linear resonator in a polarization maintaining configuration. Another advantage is the capability of tuning the pulse wavelength. Yet another advantage is the capability of tuning the pulse repetition rate.

These and other embodiments, aspects and advantages of the invention will become more apparent in light of the following detailed description, including the accompanying drawings and appended claims.

BRIEF DESCRIPTION OF THE DRAWINGS

FIGS. 8A, 8B, and 8C show one embodiment of a mount for holing a fiber collimator.

DETAILED DESCRIPTION OF THE INVENTION

Various embodiments of the invention are now described in detail with specific reference to "fiber". Although the term "fiber" is in general understood as an optical fiber comprising a center core and an outer portion that contains an optical beam, "fiber" is used throughout this disclosure to include any optical waveguiding conduit such as optical fibers and waveguides.

Figure 1:
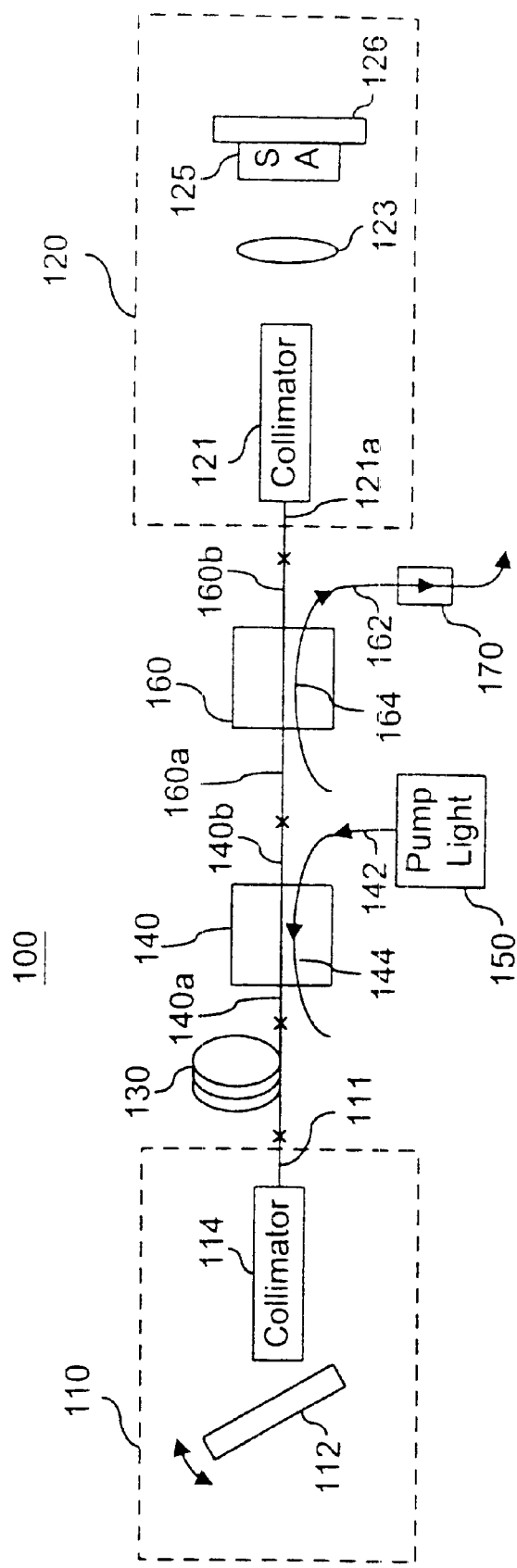
FIG. 1 is a diagram showing one embodiment of a polarization-maintaining linear-cavity fiber laser.

FIG. 1 is a diagram showing one embodiment 100 of the mode-locked fiber laser in a linear cavity configuration. The fiber laser 100 has an optical resonator formed of a first reflective element 110, a fiber gain medium 130, a fiber optical coupler 140 for coupling a pump beam to the fiber gain medium 130, and an optical module 120 having a saturable absorber 125 for mode locking and a second reflective element 126 to provide optical feedback for laser oscillation.

A means for coupling the laser pulses out of the resonator as the output of the fiber laser 100 can be implemented in a number of ways. FIG. 1 shows a fiber output coupler 160 for producing the laser output in which an optical isolator 170 may be used to reduce any optical feedback to the laser resonator. Alternatively, the laser output may be implemented by making a reflector at one end of the resonator, e.g., the reflector 126, partially transmissive at the laser wavelength (e.g., a few percent) or by using a beam splitter to reflect a small fraction of the intracavity beam out of the resonator.

The fiber gain medium 130 is a doped fiber segment with desired optical transitions for laser oscillation. One class of commonly used dopants is rare-earth ions such as erbium, holmium, neodymium, samarium, thulium and ytterbium. A suitable pump wavelength is usually at a wavelength shorter than the laser wavelength due to the atomic transitions in most dopants. For example, $Er^{+3}$ ions can be doped in silica/fluoride fibers to produce laser oscillations at 1.55 $\mu$m by using the laser transition $^4I_{11/2} \rightarrow {}^4I_{15/2}$ and a pump beam at 980 nm or 1480 nm. An Er-doped fiber is an optical gain medium known for the high efficiency. A typical Er-doped fiber can produce a gain of up to or greater than 20 dB with several milliwatts of pump power at 980 nm or 1480 nm.

In addition, two or more different rare-earth ions can be mixed together to achieve certain pump and laser wavelengths that may not be readily available from a single doping element. For example, erbium ions and ytterbium ions can be doped in silica fibers at some relative proportion to produce laser oscillations near or at 1.5 $\mu$m for a pump wavelength at about 1.05 $\mu$m. Such doped fibers can be advantageously used as gain media to use pumping light sources around 1.05 $\mu$m (e.g., diode-pumped YAG lasers) since these light sources are well developed and commercially available at a relatively low price.

Polarization-maintaining single-mode ("PM") fibers or polarizing single-mode fibers are preferable for any fibers in the optical path of the laser pulses, i.e., the doped fiber 130 and other undoped fiber segments linking various optical elements in the resonator. Fiber segments 140a, 140b, 160a, 160b, and 121a for linking optical couplers 140, 160 and optical collimator 121 are such examples. Preferably, fiber segments 144 and 164 in the couplers 140 and 160 are also PM or polarizing fibers although regular fibers may be used. A polarization-maintaining fiber is configured to have well-defined principal axes for two mutually orthogonal polarizations. A polarizing fiber has a single principal polarization axis. These two types of fibers can be configured so that a principal axis is essentially not influenced by environmental conditions, such as fiber position, temperature, and stress. Therefore, the polarization of a beam propagating in such a fiber can be maintained. In the following description, "polarization-maintaining fiber" fiber will be used to include any fiber or optical waveguide that can preserve an optical polarization of a beam in a resonator.

All polarization-maintaining fiber segments in the fiber laser 100 should be aligned so that the respective principal axes of different fiber segments are parallel with respect to one another. This forms a polarization-maintaining construction that maintains the polarization of optical pulses along a principal axis of the polarization-maintaining fibers. As the laser oscillation is building up from the spontaneous emission in the resonator, a principal axis with the minimum loss defines the polarization of the laser output. This polarization maintaining property is only needed to maintain the polarization of light at or near the laser wavelength and may not be required at the pump wavelength.

The fiber laser 100 of FIG. 1 provides an optical resonator to build an electro-magnetic field due to the presence of optical gain medium and optical feedback. The electrical field distribution inside the resonator must satisfy a resonance condition to generate a desired laser oscillation. One important aspect of this resonance condition is the state of the polarization of the electrical field inside the resonator, which can affect the feedback mechanism of the laser resonator. At least two polarization states are generally possible in a laser resonator. Preferably, only one polarization state is selected and maintained for lasing to achieve a stable laser oscillation since two or more polarization states compete with one another for lasing and may cause adverse chaotic lasing operations. The fiber gain medium 130 and other fiber segments in the laser cavity provide an optical conduit in which the electrical field satisfying the resonance condition is distributed. Therefore, these fibers should maintain the selected polarization state.

Conventional single-mode fibers are not required to be polarization maintaining because many optical communication fiber devices and systems and other applications use optical fibers to simply transmit optical energy rather than an optical field. Such a conventional single-mode fiber does not have well-defined polarization axes for the two polarization modes supported by the fiber. The axes of the polarization can change with environmental conditions such as fiber position, temperature, and stress. As a result, the polarization of light in a conventional fiber varies upon the environmental change and the passage of time, often in a unpredictable manner. Therefore, one or more polarization control elements are usually implemented in fiber lasers that use non-PM fibers. However, polarization control elements often require optical alignment with high precision and complex diagnosis equipment for determining the polarization state. The need for periodic maintenance of the alignment of these polarization control elements can severely limit the utility of fiber lasers in industrial and commercial applications such as massive communication systems and many non-optical-field applications.

The polarization-maintaining laser configuration using PM fibers eliminates the need for maintenance of the polarization state. The fiber laser 100 can be designed and constructed using PM fibers to achieve an essentially maintenance-free laser operation. A polarization-selecting component such as a polarizer, or a grating can be easily placed in the laser resonator to eliminate the unwanted polarization state(s).

Referring to FIG. 1, a pump light source 150 produces a pump beam at one or more desired pump wavelengths within a suitable pump wavelength range based on the dopant used in the fiber gain medium 130. For Er-doped silica fibers to effect laser oscillations at or near 1.55 $\mu$m, one or more allowed wavelengths for the pump light source 150 are approximately within a range from 965 nm to 995 nm. Any light-emitting device may be used in the pump light source 150, including a semiconductor diode laser, a light-emitting diode, or a wide spectral light source with a narrow bandpass filter. A fiber segment 142 is used to guide the pump beam from the pump light source 150 into the resonator.

Figure 2A:
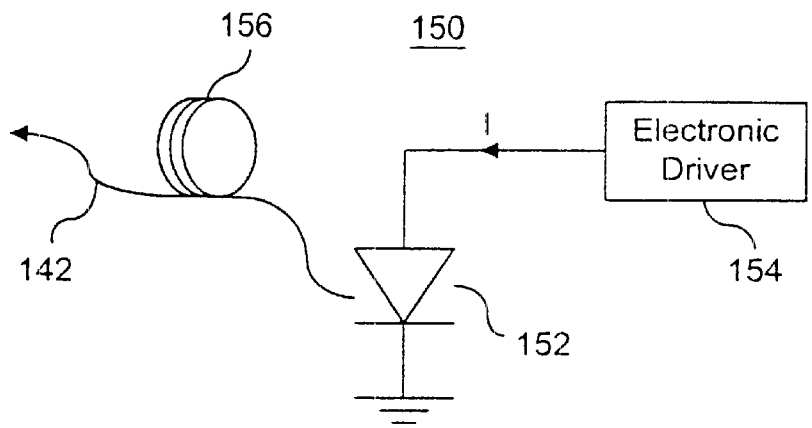
FIGS. 2A, 2B, and 2C show different embodiments of a pump light source.
Figure 2B:
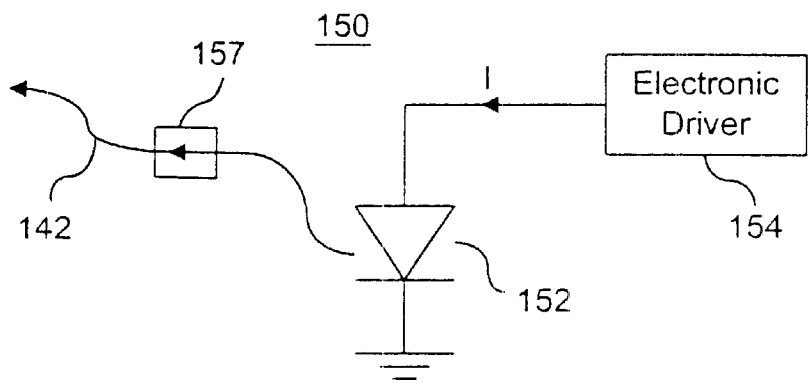
Figure 2C:
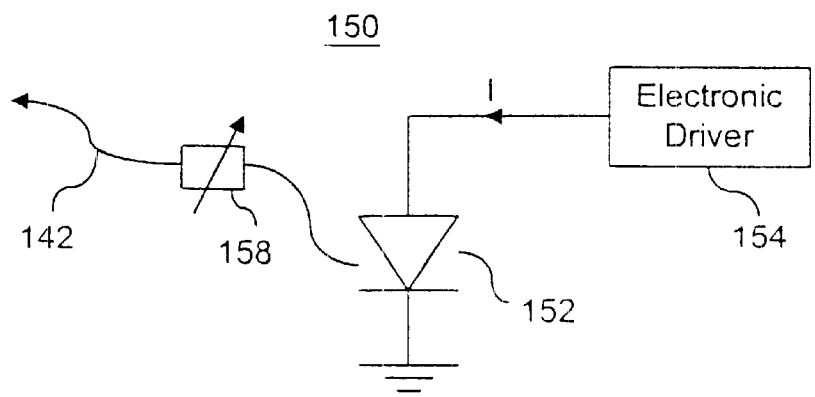

FIGS. 2A, 2B, and 2C show three exemplary configuration of the pump light source 150. An electrically driven light-emitting element 152 (e.g., a LED or laser diode) is coupled to the fiber 142. An electronic driver 154 connected to the light-emitting element 152 provides a driving current and a pump power control. An optical control element, such as a wavelength-selective attenuator 156 formed of a fiber loop which transmits light at the pump wavelength and attenuates light at the laser wavelength as in FIG. 2A, an optical isolator 157 as in FIG. 2B, or a variable attenuator 158 as in FIG. 2C, may be disposed in the undoped fiber segment 142 to reduce any optical feedback to the optical resonator. These elements reduce laser noise and improve the laser stability.

The pump optical coupler 140 is disposed relative to the doped fiber segment 130 to couple the pump beam in the fiber 142 into the doped fiber segment 130. Two undoped fiber segments 140a and 140b may be used to optically coupled the coupler 140 into the resonator. The fiber 140a is connected to one end of the doped fiber 130 by, for example, fusion splicing. The pump beam is directed into the doped fiber 130 to produce population inversion at a desired optical transition. This initiates spontaneous emission at the desired laser wavelength defined by the optical transition and builds up the laser oscillation due to the optical feedback as the output power of the pump light source 150 exceeds a threshold level. Since the laser wavelength is different from the pump wavelength, the pump optical coupler 140 should be a wavelength-division multiplexer ("WDM"). For Er-doped fiber laser, the WDM 140 is configured for coupling energy between two different channels near a 1.55-$\mu$m lasing region (e.g., from 1520 nm to 1580 nm) and near a 0.98-$\mu$m pump region (e.g., from 965 nm to 995 nm).

The optical pumping geometry shown in FIG. 1 is designed to increase the pumping efficiency and to reduce the amount of the pump power at the pump wavelength that reaches the saturable absorber 125. This extends the life of the saturable absorber 125 and improves the laser operation. More specifically, the WDM 140 is placed in the optical path between the doped fiber medium 130 and the saturable absorber 125 to couple the pump beam from the pump light source 150 into the doped fiber medium 130. Thus, a majority of the pump power is absorbed by the doped fiber medium 130. A fraction of the pump beam transmitted through the doped fiber medium 130 is reflected towards the saturable absorber 125 by the first reflective element 110. The first reflective element 110 can be designed to further reduce the reflected pump power towards the saturable absorber 125. This may be achieved by, for example, using an angle-polished fiber end facet, an anti-reflection coating for the pump wavelength, or implementing a bandpass filter that absorbs light at the pump wavelength and transmits the light at the laser wavelength.

The first reflective element 110 as shown in FIG. 1 includes a reflective grating 112 and a fiber collimator 114 that is coupled to one end of the doped fiber segment 130 through an undoped fiber segment 111. Alternatively, the collimator 114 may be directly coupled to the doped fiber 130. The grating 112 is rotatably mounted at a fixed position relative to the collimator 114 so that the grating 112 can be rotated to change the grating Bragg condition to select a desired laser wavelength for optical feedback. Optical signals at wavelengths that do not satisfy the Bragg condition are attenuated by the grating 112 and thus cannot build up to form laser oscillations. Therefore, the grating 112 provides a frequency tuning mechanism for tuning laser frequency within the gain spectral range of the doped fiber 130. The grating angle adjustment may be implemented by using an optical mount, rotating positioner or the like.

In addition, the grating 112 may also be used to maintain the polarization of the optical pulses by aligning the grating groves parallel or perpendicular to the preferred principal axis of the PM fibers.

The saturable absorber 125 provides a mode-locking mechanism in the laser 100. The absorption of the saturable absorber 125 is dependent on the optical intensity in such a way that the absorption coefficient is less at high intensities than that at low intensities. Hence, the intensity fluctuation in the laser resonator can be sharpened by the saturable absorber 125 to generate short optical pulses. As the laser oscillation reaches a steady state, stable optical pulses with a constant pulse repetition rate are formed. This use of a saturable absorber for mode locking is well known. The saturable absorber 125 may be formed by a number of materials such as chemical dyes, polymers or semiconductor materials (e.g., quantum-well structures). In general, the saturable absorber 125 can be placed anywhere within the laser resonator but the position as shown in FIG. 1 is preferable.

Semiconductor saturable absorbers with bandgaps not exceeding the photon energy corresponding to the laser wavelength are preferred in implementing the invention. For an Er-doped fiber as the fiber medium 130 to produce laser pulses at 1.55 $\mu$m, a suitable semiconductor saturable absorber should have a bandgap equal to or less than the photon energy at 1.55 $\mu$m. Hence, InGaAs or InGaAsP may be used as the saturable absorber 125. The semiconductor saturable absorber 125 may be in contact with the reflecting surface of the second reflective element 126 or may be integrated to the second reflective element 126 as in a multiple quantum well structure that has a quantum-well Bragg reflector.

A semiconductor saturable absorber may need to undergo certain material processing steps to exhibit desired saturable absorption characteristics. It has been found that optical damage, ion implantation, or low-temperature growth can be used for this purpose. Lin et al. disclose the ion implantation method in U.S. Pat. No. 5,436,925, which is incorporated herein by reference. A desired range of the linear absorption (e.g., the small signal absorption for optical intensity much smaller than the saturation intensity) of the saturable absorber 125 is from approximately 2% to approximately 90%, and more preferably from approximately 25% to approximately 75%.

A semiconductor saturable absorber is preferred in practicing the invention partially because a special characteristics can be used to realize self-initiated mode locking. A semiconductor saturable absorber can have both intra-band and inter-band transitions. The inter-band process has a slower response and a lower saturation energy than the intra-band process. Thus, the slow saturation process initiates the mode locking even when the intracavity intensity fluctuates at a low power level. As the pulse intensity increases and the pulse width reduces, the peak pulse intensity saturates the semiconductor absorber to effect the fast saturation process which further sharpens the pulses. This unique feature can be used for a "turn-key" operation of the fiber laser 100 in the sense that no additional operation other than turning on the pump light source 150 is necessary to achieve mode-locked pulsed laser oscillations.

Using a semiconductor absorber also allows for the use of low-power diode lasers of several milliwatts to tens of milliwatts as the pump light source 150 since the slow saturation inter-band process can initiate mode locking at low intracavity intensities. This is particularly important in practical devices and systems since low-power diode lasers used for telecommunication (e.g., near 980 nm or 1480 nm) can have a life time up to or longer than 200,000 hours. The fiber laser 100 with such a low-power diode pump source can be operated for the life time of the pump diode laser. For optical data communication applications, this significantly reduces the down time and maintenance. As a comparison, a fiber laser based on a high-power diode pump laser of several hundred milliwatts may need to replace the diode pump laser every several hundred hours. In addition, low-power diode lasers are less expensive than high-power diodes, reducing the manufacturing cost.

Optical nonlinear effects in fibers may be also used to induce the effect of the saturable absorption of a saturable absorber for mode locking. However, such nonlinear effects demand high optical intensities. The preferred operation of the fiber laser 100 uses pump power much lower than the threshold level of the fiber nonlinearity (about $10^2$ Watts) to avoid such effect but sufficient to generate light at the laser wavelength from the fiber gain medium to saturate the semiconductor saturable absorber. Use of the semiconductor saturable absorber also avoids the adverse residue CW lasing in mode locking using only fiber nonlinear effects.

A collimator 121 and a lens 123 are disposed in the optical module 120 to couple the optical energy between the fiber segment 121a and the saturable absorber 125. The collimator 121 shapes the optical beam from the fiber into a substantially parallel beam. The lens 123 is positioned with respect to the saturable absorber 125 so that the spacing therebetween is about the focal length of the lens 123 with an adjustable range within the Rayleigh length of the intracavity optical pulses. Preferably, the lens 123 focuses the beam onto the saturable absorber 125 with a spot size down to and/or smaller than about 5 $\mu$m in diameter.

Another aspect of the fiber laser 100 in FIG. 1 is a tuning mechanism for adjusting the pulse repetition rate. This tuning mechanism can be achieved by changing the cavity length of the resonator, i.e., the optical length between the grating 112 and the second reflective element 126. For example, a fiber segment may be stretched or the distance of a collimated beam may be changed such as the air-gap distance between the lens 123 and the collimator 121. When the fiber laser 100 is configured to have one laser pulse per a round trip time, the round trip time within the resonator is the temporal separation between two adjacent pulses. Under this condition, changing the cavity length effects a change in the pulse repetition rate. A number of techniques may be used to change the cavity length. For example, a positioner, such as a mechanical translation stage or a piezo-driven positioner, may be engaged to the first or the second reflective element to change the cavity length. Specifically, such a positioner can be used to change the relative position of the grating 112 with respect to the collimator 114. A fiber stretcher such as a piezo fiber stretcher can be disposed in any fiber segment to change the cavity length by applying an electrical control signal to the piezo.

Figure 3A:
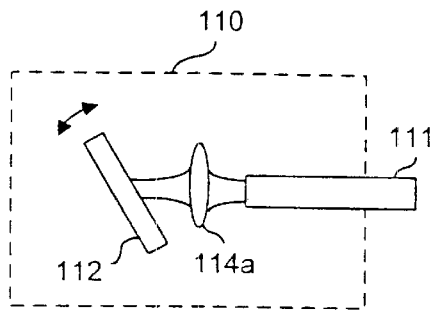
FIGS. 3A, 3B, 3C, 3D, 3E, and 3F show exemplary embodiments of the first reflective element.
Figure 3B:
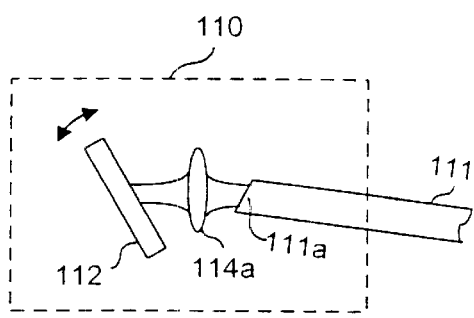
Figure 3C:
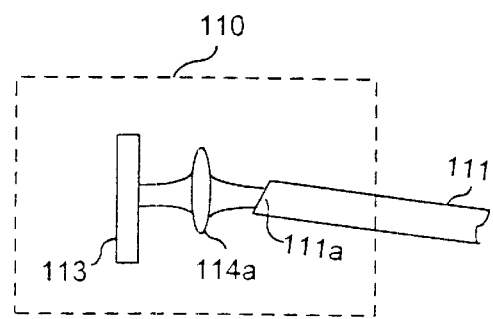
Figure 3D:
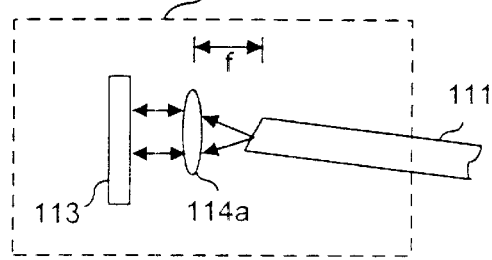

FIGS. 3A–3F show alternative embodiments of the first reflective element 110. FIG. 3A uses a lens 114a in place of the collimator 114 in FIG. 1. The lens 114a is placed away from the grating 112 with a spacing larger than the lens focal length f to image the free end facet of the fiber 111 to the grating 112. Since the beam is a Gaussian beam, the beam on the grating surface is essentially collimated within the Rayleigh length range. The output facet of the fiber 111 as shown is perpendicular to the fiber core. This facet is preferably coated with an anti-reflection coating at the pump wavelength to reduce the reflection of the pump beam coupled into the resonator from the coupler 140. This coating may also be anti-reflective at the laser wavelength to reduce a sub-cavity effect due to intra-cavity reflection at the laser wavelength. FIG. 3B is similar to FIG. 3A except that the output facet 111a of the fiber 111 is polished at an angle of several degrees (typically, about 6°~8°) to reduce optical reflection at both laser wavelength and pump wavelength. The angle-polished fiber 111 is tilted at an angle with respect to the optic axis of the lens 114a in order to achieve proper optical coupling. FIG. 3C shows an embodiment that uses a reflector 113 with a high reflectivity at the laser wavelength and a low reflectivity at the pump wavelength. FIG. 3D places a lens 114a away from the output facet of the fiber 111 by a focal length to collimate the beam incident to the high reflector 113. This optical configuration can also replace the focusing configuration shown in FIGS. 3A–3C.

Figure 3E:
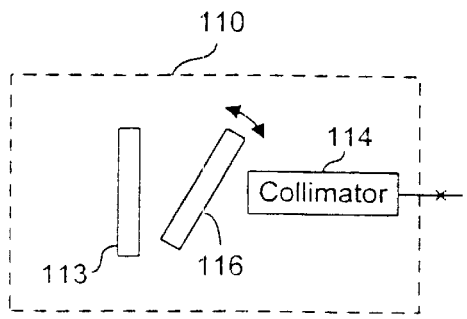

FIG. 3E shows an embodiment of the first reflective element 110 that uses a bandpass filter 116 to tune the laser wavelength within the gain spectral profile of the fiber gain medium 130. The filter 116 may be an interference filter with a transmission wavelength as a function of the angle. Thus, the laser wavelength within the gain spectral range of the laser doped fiber 130 can be selected by adjusting the filter angle. The reflector 113 may be displaced with respect to the collimator 114 by a positioner to change the cavity length, thereby the pulse repetition rate. Other bandpass filters such as birefringence filter may also be used. Furthermore, a reflective fiber grating may be used as the first reflective element 110. The fiber grating may be configured to have a tuning mechanism to change the resonant Bragg condition such as the grating spacing (e.g., fiber stretching by a piezo element) or the effective index of refraction. This tunes the resonant wavelength of the fiber grating, thus changing the laser wavelength.

The above optical bandpass filtering to select the laser wavelength may be implemented by using a fiber pigtailed bandpass filter which may use an interference filter, a birefringence filter, or a grating to tune the laser wavelength. Such a fiber pigtailed filter may be conveniently disposed anywhere in a fiber laser and can be tuned manually or electronically. The connecting fiber segments on such a filter should be the PM type when a polarization-maintaining configuration is desired.

Figure 3F:
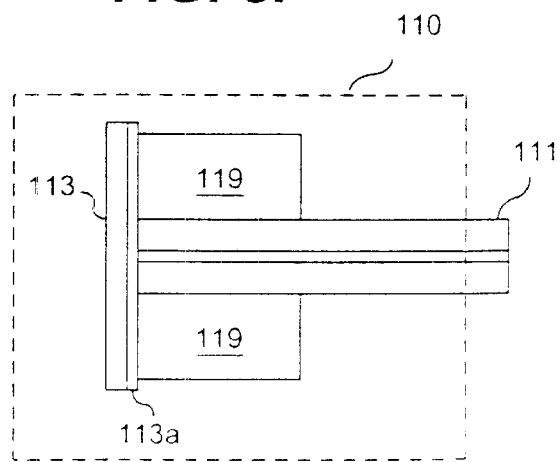

FIG. 3F further shows another embodiment of the first reflective element 110 in which the high reflector 113 is directly formed over a cleaved facet of the fiber 111. A layer of adhesive 113a may be used to form the direct contact between the reflector 113 and the fiber facet. The facet is perpendicular to the fiber core so that the reflecting surface of the reflector 113 is also perpendicular to the fiber core. A supporting structure 119 has a through hole that is sized to tightly hold the fiber 111 at a desired position. This design can be easily manufactured at low cost. Alternatively, a reflecting coating may be directly applied to the facet of the fiber 111 to function as the first reflective element.

Figure 4A:
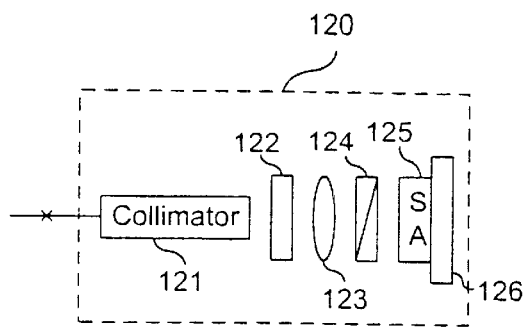
FIGS. 4A, 4B, 4C, and 4D show exemplary embodiments of the second reflective element.

The fiber laser 100 may include an optional variable attenuator 122 as shown in FIG. 4A in the resonator to control the intracavity optical intensity to improve the mode locking by the saturable absorber 125. A polarizer 124 aligned with a specified polarization axis of the PM fibers may also be placed in the resonator to further ensure the proper polarization of the laser pulses. When the fibers-have two orthogonal principal axes, the polarizer 124 eliminates the possibility of laser oscillations in two polarization states. FIG. 4A shows one possible configuration for the second reflective element 120 that includes the attenuator 122 and the polarizer 124.

Figure 4B:
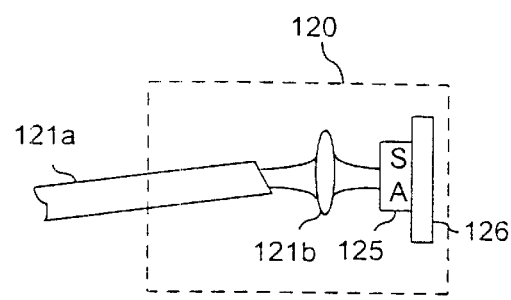
Figure 4C:
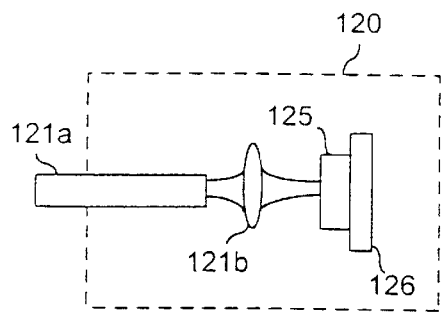

FIGS. 4B and 4C show additional embodiments of the second reflective element 120. A lens 121b is placed between the fiber 121a and the saturable absorber 125 to couple the optical energy to and from the saturable absorber 125 by imaging. FIG. 4B shows the end facet of the fiber 121a is angle-polished to reduce the effect of the reflection.

Figure 4D:
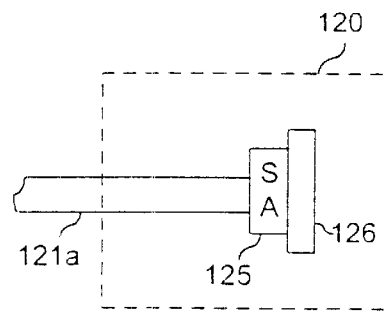

The construction of the unit 120 as shown in FIGS. 1 and 4A–4C may be simplified by directly coupling the free end of the fiber 121 to the saturable absorber 125. FIG. 4D illustrates such a construction. This construction eliminates optical elements such as collimator 121 and lens 123 and respective optical alignment. For a single-mode fiber for 1.55 μm, the beam spot size on the saturable absorber 125 may be approximately from 3 μm to 10 μm in diameter.

Figure 4E:
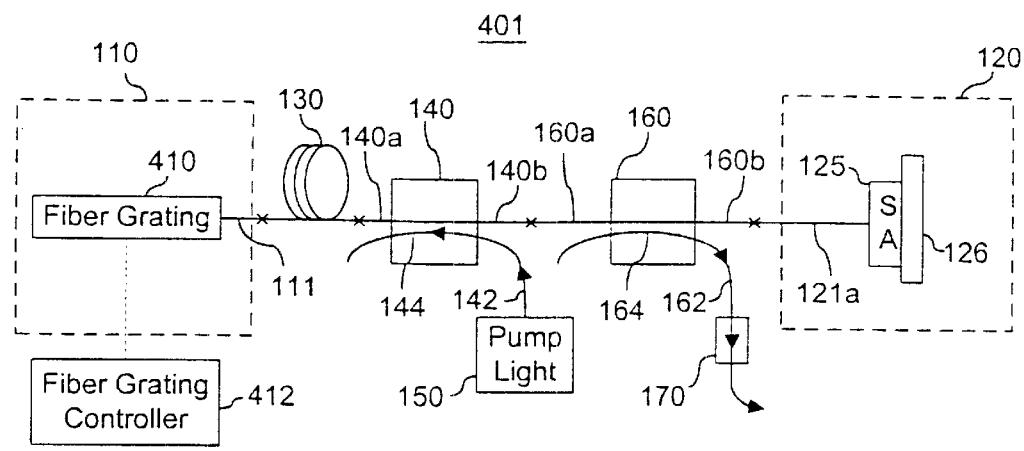
FIGS. 4E and 4F show two fiber lasers using all fiber components.
Figure 4F:
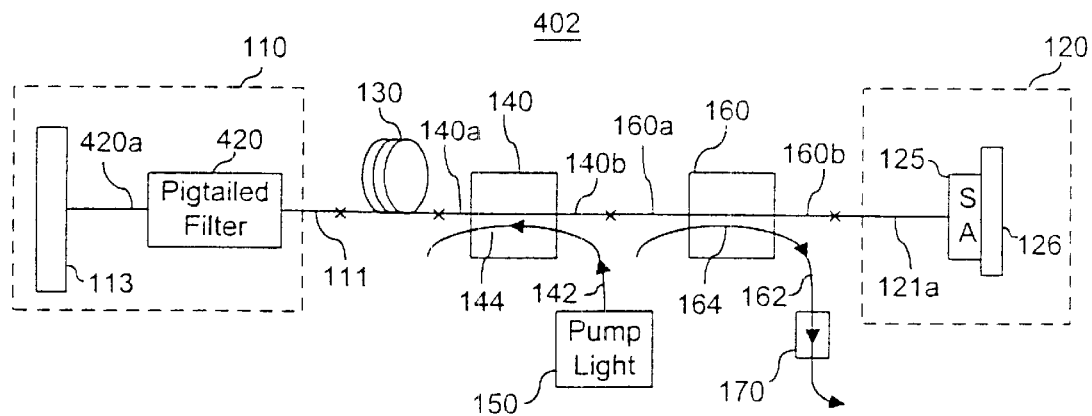

A tunable "all-fiber" fiber laser can be constructed by combining a fiber grating or a fiber pigtailed bandpass filter with the second reflective element in FIG. 4B. FIGS. 4E and 4F show two exemplary all-fiber laser configurations 401 and 402.

The fiber laser 401 in FIG. 4E uses a fiber grating 410 as the first reflective element to provide optical feedback and frequency tunability. A fiber grating controller 412 controls the Bragg condition of the fiber grating 410 to tune the reflected wavelength. One example of the controller 412 is a piezo fiber stretcher which changes the grating period: the laser wavelength increases with the grating period. The second reflective element 120 is the same as the embodiment in FIG. 4D.

The fiber laser 402 in FIG. 4F uses the same construction for the second reflective element 120 as in the fiber laser 401 FIG. 4E but a different configuration for the first reflective element 110. Specifically, a tunable pigtailed bandpass filter 420 is connected to the fiber gain medium 130 by, for example, fusion splicing. The other fiber 420b of the filter 420 is directly coupled to a high reflector 113 to form a construction similar to FIG. 3F. Alternatively, the high reflector 113 may be a reflective coating formed on the facet of the fiber 420a. In addition, the pigtailed bandpass filter 420 may be placed at any other fiber section within the resonator.

A fiber stretcher can be disposed in any fiber segment in the lasers 401 and 402 to tune the pulse repetition rate by changing the total optical length of the laser resonator. One location for the fiber stretcher can be the fiber gain medium 130.

A jittering element may be further included in a fiber laser to facilitate the mode locking. For example, the aforementioned piezo-driven fiber may also be used to induce a disturbance in the resonator. As a control voltage is applied to the piezo, the action of stretching in the portion of the fiber on the piezo induces a disturbance to initiate the mode locking.

A further aspect of the invention is reduction of noise and timing jitter in the output pulses. The polarization-maintaining configuration by using PM fibers essentially eliminate the noise and jitter caused by variations in the light polarization. But unwanted optical feedback signals can also cause the laser wavelength and intensity to fluctuate, or even cause a fiber laser to lase chaotically. In addition, unwanted feedback can lead to a breakdown of an established mode-locking operation. The unwanted optical feedback signals can be reduced in a number of ways.

For example, the first reflective element 110 can be designed to reflect only the light at the laser wavelength and to significantly reduce or eliminate any light reflection at the pump wavelength. This reduces the adverse feedback to the pump light source 150. One implementation uses an angle cleaved or angle polished facet (e.g., larger than 6°) at the free end of the PM fiber 140a of the WDM coupler 140. Another implementation applies an anti-reflection coating designed for the pump wavelength on the facet at the free end of the PM fiber 140a of the WDM coupler 140.

For another example, unwanted feedback to the mode-locked fiber laser can be reduced by using a wavelength selecting attenuating element as shown in FIGS. 2A–2C or the isolator 170 in the output fiber 162. The collimators 121, 114 and any lens (e.g., lens 123), and any light-transmitting surface of the fiber laser 100 in FIG. 1 may be designed to have a significantly reduced reflectivity, e.g., less than $10^{-5}$. The designs shown in FIGS. 3A–F can also be used to reduce adverse reflections in the laser resonator. The free end of the output fiber 162 can also be cleaved at an angle to reduce reflection. A reflecting surface (e.g., a reflective grating or a mirror) in the laser resonator should have a high reflectivity at the laser wavelength and a low reflectivity at the pump wavelength.

A fiber laser in accordance with the invention may be operated either in a soliton mode or in a non-soliton mode. Soliton is a special nonlinear phenomenon in which an optical pulse maintains its shape and spectral profile essentially unchanged during propagation in fibers. An optical pulse traveling in a fiber is subject to the fiber dispersion so that different frequency components in the pulse travel at different group velocities. This dispersion causes pulse broadening in the time domain. In addition, a pulse also experiences a nonlinear effect "self phase modulation" ("SPM") caused by the intensity dependence of the refractive index of the fiber. SPM can lead to new frequency components in high intensity pulses, thus effectively broadening the pulse in the frequency domain. Soliton pulses are generated from a fiber laser when the fiber dispersion is negative, i.e., the group velocity of a high frequency component is higher than that of a low frequency component, and the group velocity dispersion compensates for SPM.

Soliton pulses are desirable in certain applications such as optical communication systems since a soliton pulse is transform-limited (i.e., the cleanest frequency components for a given pulse width) and has low pedestals and noise. In addition, soliton effects can be used for pulse compression so that a mode-locked soliton fiber laser can include a pulse compression module to produce soliton pulses with a further reduced pulse width. It has been found that several parameters in the above PM fiber lasers can be adjusted to achieve a soliton operation. For example, the power level and the total group velocity dispersion inside the resonator can be adjusted to substantially cancel the effects of SPM. This configuration results in soliton pulses.

Figure 5A:
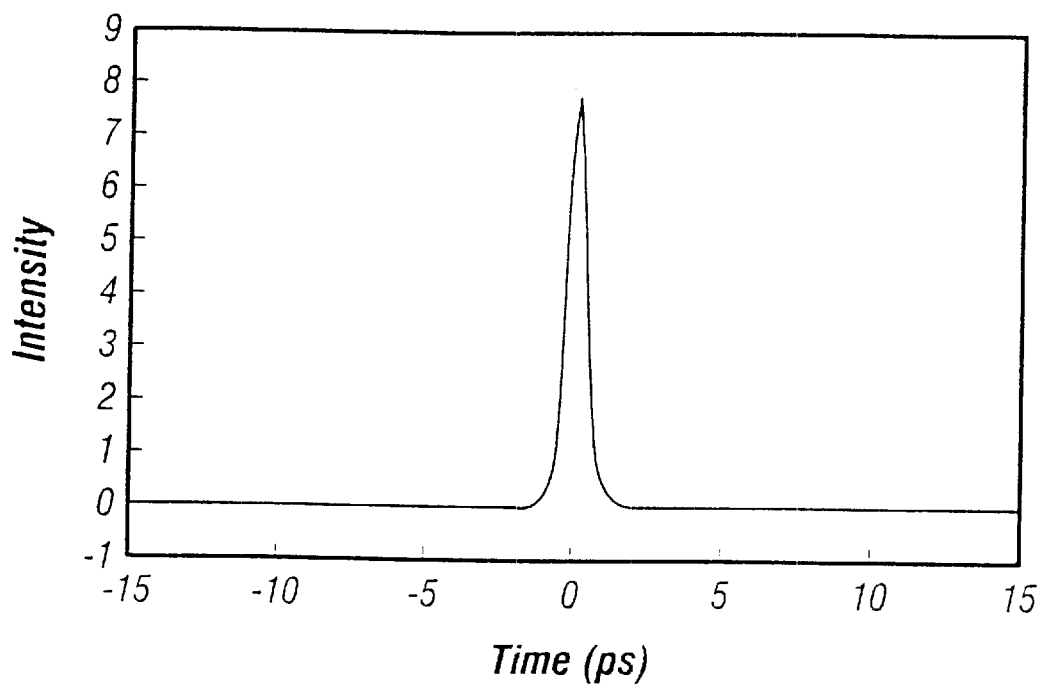
FIGS. 5A, 5B and 5C are charts showing measured pulse shape, spectral profile, and pulse width v. wavelength of a fiber laser in accordance with the invention.
Figure 5B:
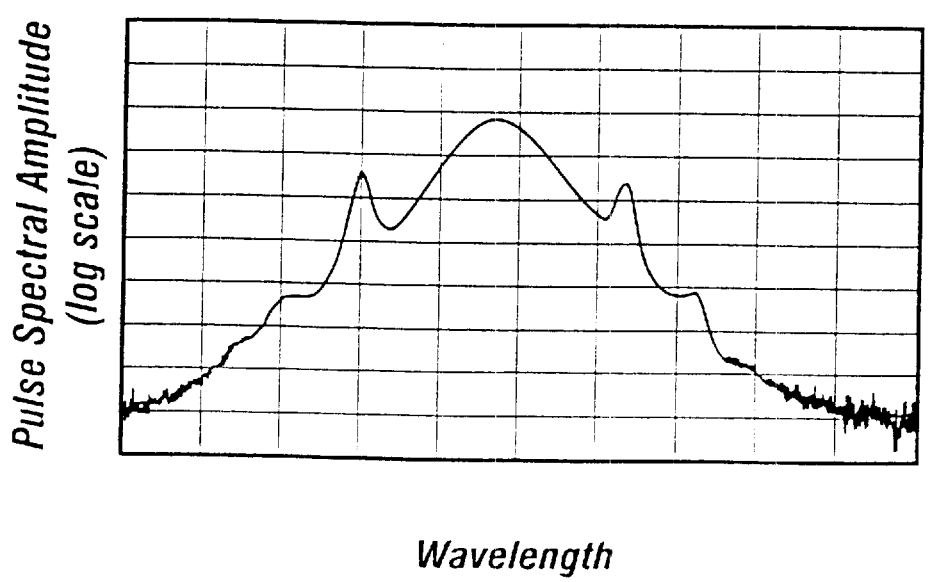
Figure 5C:
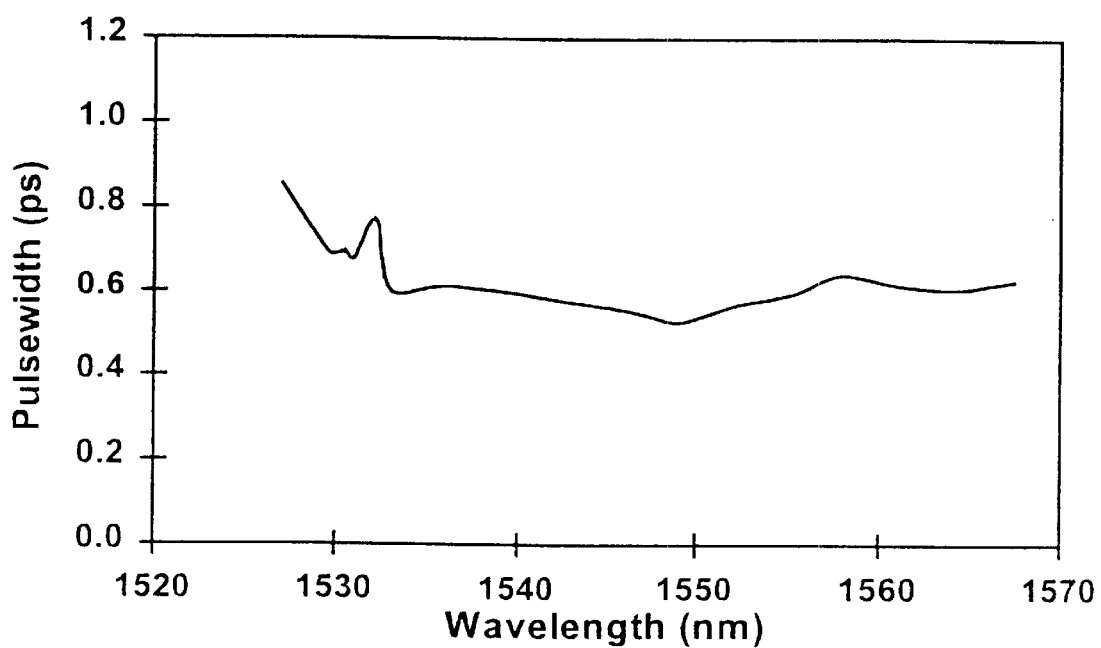

The soliton configuration can produce transformed-limited pulses of about 0.5 ps with a time-bandwidth produce of about 0.32 by using a 1550-nm Er-doped PM fiber laser. FIG. 5A is the autocorrelation trace of such an Er-doped PM fiber laser similar to the embodiment 100 in FIG. 1 except that the configuration shown in FIG. 3A is used as the first reflective element 110. The autocorrelation is measured by mixing two beams that undergo different time delays and are split from the laser output in a nonlinear crystal to produce a second harmonic generation signal. The vertical axis represents the intensity of the autocorrelation trace. The typical relative intensity noise of this laser is about −120 dBc/Hz and a timing jitter integrated to 100 Hz is about 0.2 ps. FIG. 5B is a measured output spectrum of a laser pulse. The vertical axis is in a log scale with 5 dB per division. Each division in the horizontal axis represents 5 nm. The center wavelength of the pulse is about 1545 nm and the full width at the half maximum is about 5.31 nm. The side spectral peaks indicate the pulse is a soliton pulse. FIG. 5C further shows measured pulse width as a function of the wavelength. The pulse width remains below 900 fs as the laser is tuned from about 1525 nm to about 1568 nm by using the grating.

Alternatively, a fiber laser can also operate in a non-soliton mode as desired by setting the parameters in such a way that the group velocity dispersion and SPM are not balanced.

Figure 6:
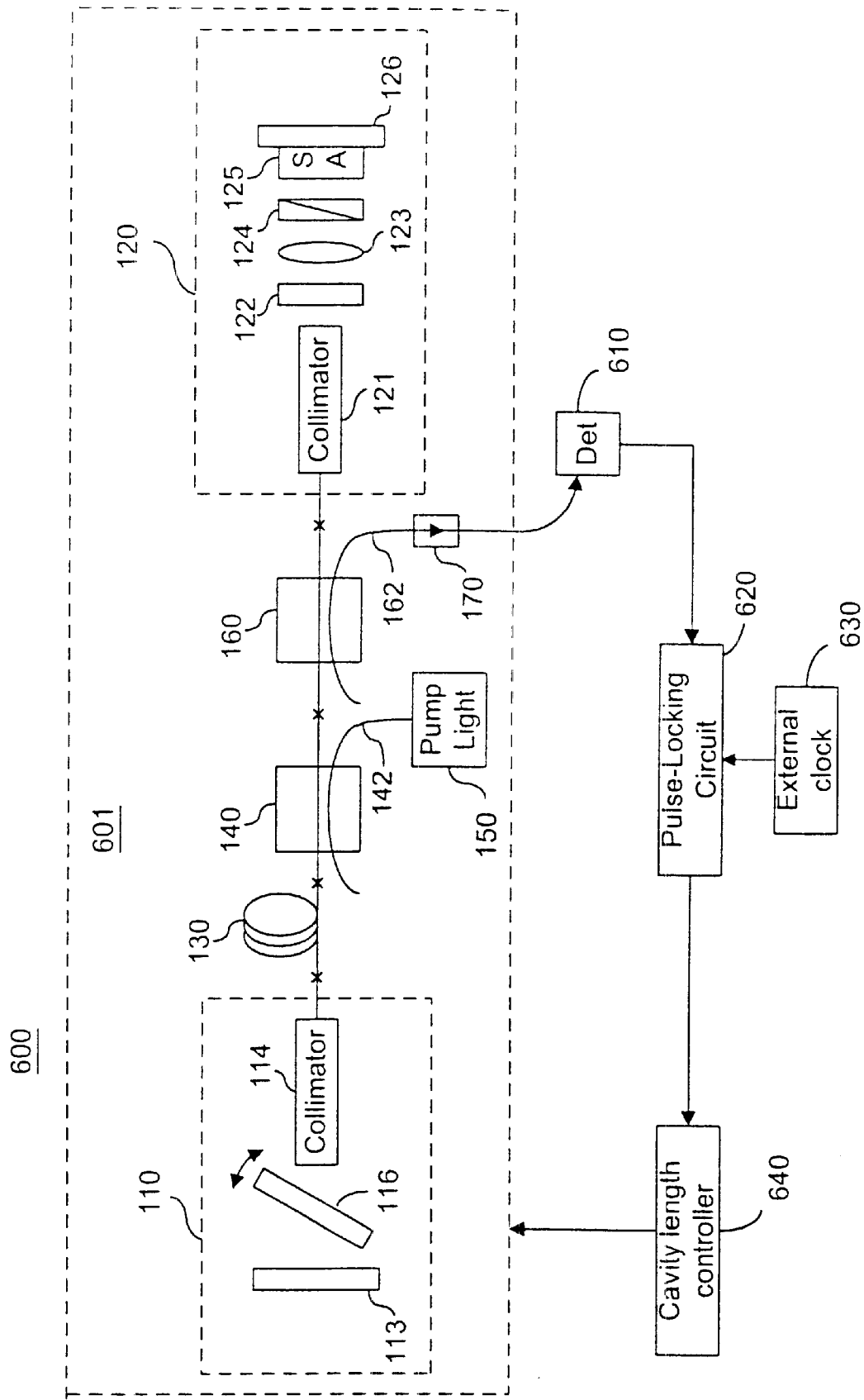
FIG. 6 shows a tunable fiber laser with a feedback loop for locking the pulse repetition rate to an external clock.

A PM fiber laser according to the invention can be configured to have tunable pulse rate by changing the optical length of the resonator. This feature can be used to lock the pulse rate to an external clock. FIG. 6 shows such a system 600. A photo detector 610 receives at least a portion of the output from a fiber laser 601. A pulse-locking circuit 620 measures the pulse rate based on an electrical signal from the detector 610. The circuit 620 further receives a reference clock signal from an external clock generator to which the pulse rate is to be locked. The pulse rate and the reference clock are compared by the circuit 620 to produce a clock error signal. The magnitude of this clock error signal indicates the amount of relative delay between the pulse rate of the laser 601 and the reference clock. The sign of the error signal indicates the direction of the relative delay. A cavity length controller 640 adjusts and maintains the cavity length according to the error signal in such a way that the error signal is reduced to a small value within a specified tolerable range.

The cavity length controller 640 may be implemented in a number of configurations. For example, one implementation uses a piezo fiber stretcher with a voltage power supply. Another implementation uses an electrically controllable positioner (e.g., driven by a step motor or piezo transducer) to change the relative position between the reflector 113 and the collimator 114.

The combination of the polarization maintaining fiber configuration, the semiconductor saturable absorber, and the simple linear cavity results in a fiber laser in accordance with the invention capable of producing ultra short lasers pulses with a turnkey operation, long term reliability, significantly reduced maintenance (even possibly no maintenance). Several adjustable optical mounts have been contemplated and used to further improve the reliability of such fiber lasers.

Figure 7:
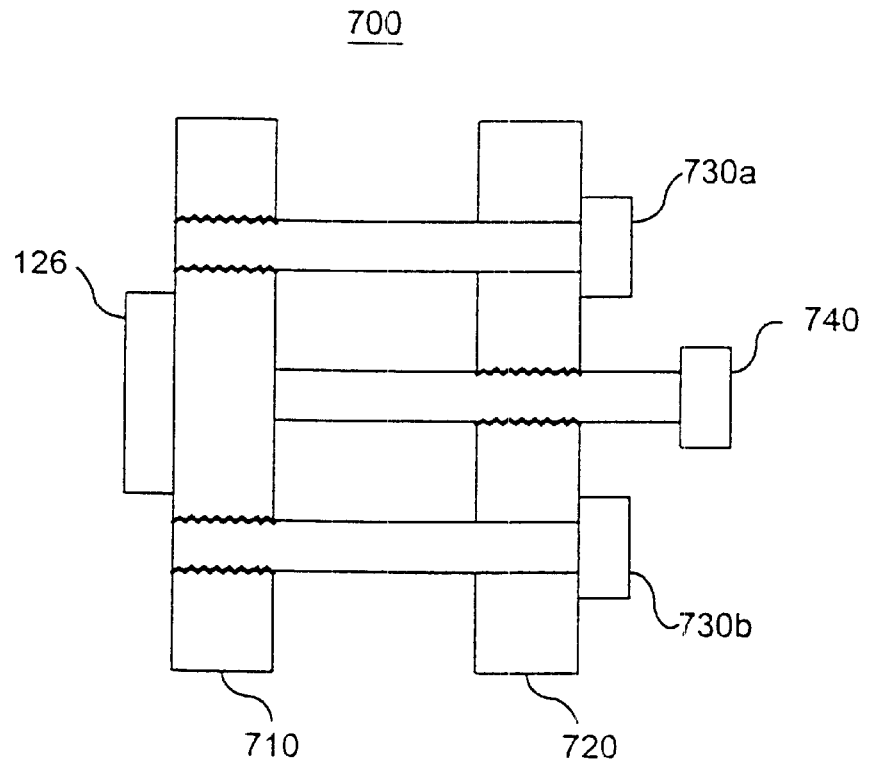
FIG. 7 is a diagram showing an optical mount free of ball bearing.

FIG. 7 shows an mount 700 suitable for holding the assembly of the saturable absorber 125 and the second reflective element 126. Two rigid plates 710 and 720 made of a rigid material (e.g., aluminum or steel) are held together by three adjustable screws 730a, 730b, and 740. Screws 730a and 730b are engaged to the plate 710 by threaded holes and to the plate 720 by through holes. Screw 740 is engaged to the plate 720 by a threaded hole and to the plate 710 by pressing against one end to central spot. The plate 720 is fixed relative to the resonator so that screws 730*a* and 730*b* controls the orientation of the plate 710 and the screw 740 controls the relative spacing from between the plates 710 and 720. This design eliminates the conventional spring-loaded ball bearing configuration for many mirror mounts and can be used to achieve long-term stability to ensure proper alignment.

FIG. 8A shows a side view of an adjustable mount 800 for holding the optical collimator 114 and 121 in the fiber laser 100 in FIG. 1. The mount 800 has a base 810 with a first base part 810*a* and a second base part 810*b* in a shape of the letter "L". The base 810 is made of a rigid material such as aluminum or steel. A slot 812 is formed in the first base part 810 to change the position of the second base part 810*b* upon being compressed by a set of screws 814*a* and 814*b*. Screws 814*a* adjust the position of the second base part 810*b* in a direction opposite to that controlled by screws 814*b*. A slot 812*b* is formed in the second base part 810*b* to split a portion thereof to form an adjustable part 810*c*. The second base part 810*b* has a through hole 820 to hold a collimator 802. Screws 816 on the adjustable part 810*c* are used to adjust the relative tilt of the part 810*c* in order to control the orientation of the collimator 802. FIGS. 8B and 8C show different side views of the mount 800 along the lines 8B—8B and 8C—8C, respectively. This design also eliminates the conventional ball bearing.

Figure 9:
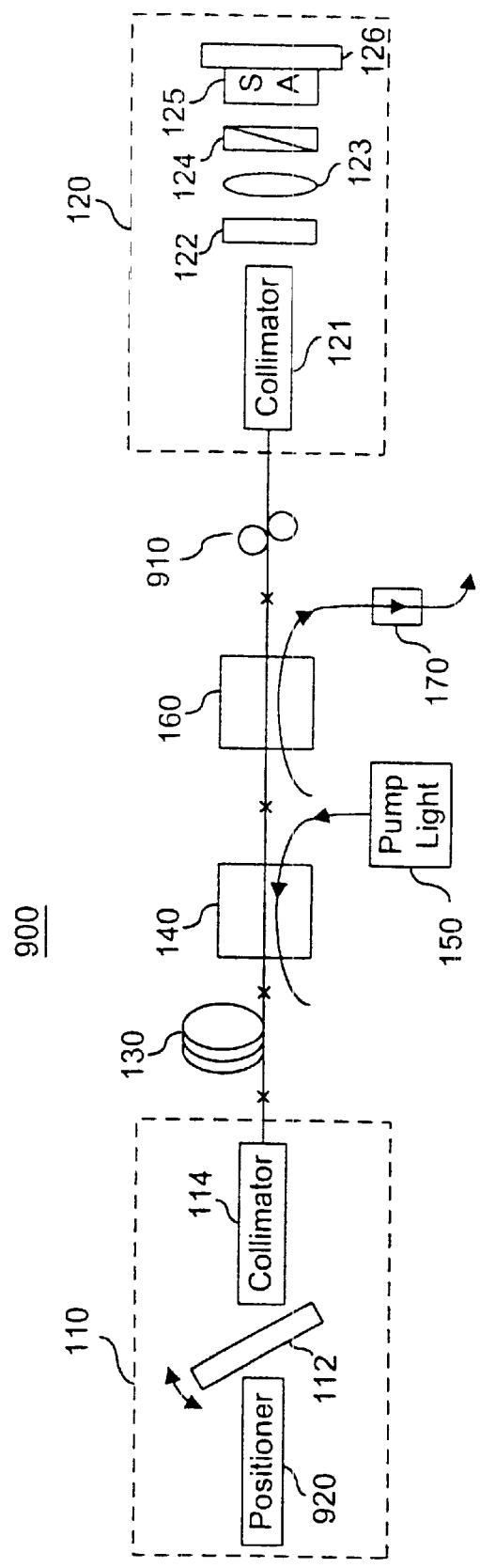
FIG. 9 shows a tunable fiber laser in a non-PM configuration.

Although the present invention has been described in detail with reference to a few embodiments, various modifications and enhancements may be possible. For example, a tunable linear-cavity fiber laser may be constructed by using non-PM fibers according to the invention. An example 900 is shown in FIG. 9 in which an adjustable positioner 920 is engaged to the grating 112 for tuning the pulse rate. A fiber polarization controller 910 is added in the resonator to maintain the light polarization since the fibers are not the PM type. An optional linear polarizer 124 may also be used.

Figure 10:
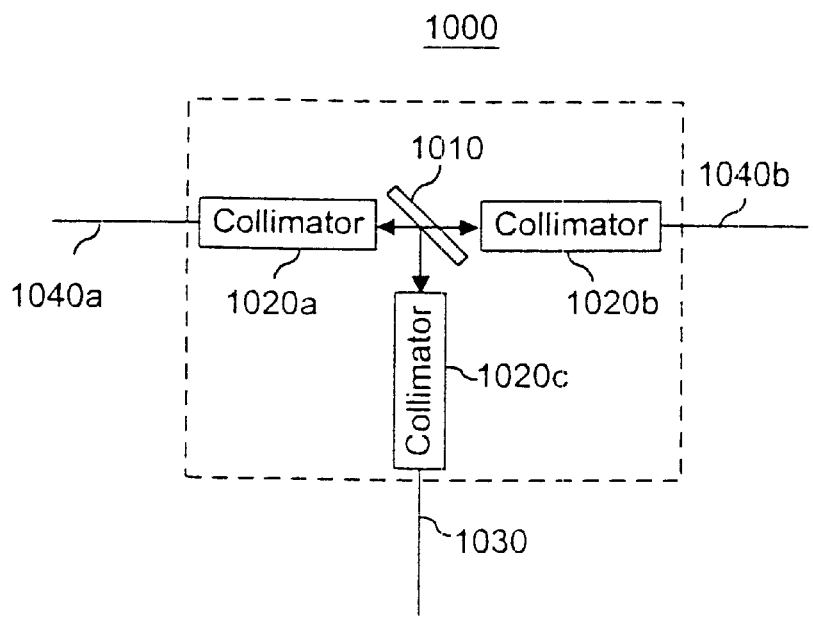
FIG. 10 is a diagram showing an optical coupler using a beam splitter in a fiber-pigtailed configuration.

The WDM 140 and output coupler 160 may also be formed by using bulk optical elements such as a beam splitter. FIG. 10 is one embodiment 1000 in a fiber pigtailed configuration. A beam splitter 1010 is optically coupled to three fiber collimators 1020*a*, 1020*b*, and 1020*c*. Fiber segments 1040*a* and 1040*b* are connected in the resonator and fiber segment 1030 is used for input or output. To use the device 1000 as an output coupler, the beam splitter 1010 is coated with a low reflectivity (e.g., about several percentage) at the laser wavelength and the fiber 1030 produces the output. To use the device 1000 as a pump coupler, the beam splitter 1010 is dichroic, i.e., coated to have a high reflectivity at the pump wavelength and to be anti-reflective at the laser wavelength.

Gratings of the reflective type have been described in various embodiments to tune the laser wavelength. However, a transmissive grating may also be used to select a desired laser wavelength to oscillate in the resonator.

These and other variations are intended to be encompassed by the following claims.

What is claimed is:

1. A passive mode-locked fiber laser, comprising:

a pump light source to produce a pump beam at a pump wavelength;

an optical fiber having at least one doped fiber segment which absorbs light at said pump wavelength to emit light at a laser wavelength within a spectral gain profile is different from said pump wavelength;

an optical coupler to couple said pump beam from said pump light source into said doped fiber segment;

first and second reflective elements disposed to form a linear optical resonator that encloses said optical fiber and supports a plurality of longitudinal modes;

a saturable absorber disposed in said optical resonator and formed of a material that exhibits an intensity-dependent absorption to effectuate a passive mode-locking mechanism to lock said longitudinal modes in phase to produce optical pulses at said laser wavelength;

a pulse frequency tuning element located in said optical resonator to adjust an optical path length of said optical resonator, during normal mode-locking operation and in response to a control signal, to control a pulse repetition frequency of said optical pulses;

an optical detector to receive a portion of said optical pulses to produce a detector output; and a control unit coupled to receive said detector output and to produce said control signal according to information that includes information in said detector output.

2. The fiber laser as in claim 1, wherein said control unit receives a master clock signal and produces said control signal to adjust said pulse repetition rate to reduce a difference between said pulse repetition rate and a clock rate in said master clock signal.

3. The fiber laser as in claim 1, wherein said optical fiber is a polarization maintaining fiber that is configured to maintain a polarization of said optical pulses.

4. The fiber laser as in claim 1, where said pulse frequency tuning element includes a fiber stretcher engaged to said optical fiber to adjust a length of said optical fiber.

5. The fiber laser as in claim 1, wherein said pulse frequency tuning element includes a positioning element engaged to change a position of at least one of said first and said second reflective elements.

6. The fiber laser as in claim 1, further comprising:

a wavelength-tuning element disposed in said optical resonator and operable to change said laser wavelength within said spectral gain profile of said doped fiber segment.

7. The fiber laser as in claim 6, wherein said wavelength-tuning element includes a tunable optical bandpass filter.

8. The fiber laser as in claim 6, wherein said wavelength-tuning element includes a tunable grating.

9. The fiber laser as in claim 8, wherein said tunable grating includes a tunable fiber grating operable to select radiation at said laser wavelength to reflect and to adjust said laser wavelength in response to a grating control signal.

10. The fiber laser as in claim 1, wherein said saturable absorber includes a semiconductor material having a bandgap equal to or less than a photon energy corresponding to said laser wavelength.

11. The fiber laser as in claim 1, wherein said saturable absorber has a slow saturation process with a low saturation intensity to initiate said optical pulses in said optical resonator and a fast saturation process with a high saturation intensity to shorten a temporal width of said optical pulses.

12. A method for generating laser pulses, comprising:

using two reflective optical elements to form a laser resonator;

disposing a fiber gain medium in an optical path linking said two reflective optical elements;

placing a saturable absorber in said optical path linking said two reflective optical elements to lock multiple oscillating resonator modes of said optical resonator to produce optical pulses;

optically detecting a portion of energy of said optical pulses to measure a pulse repetition rate of said optical pulses; and during normal mode-locking operation, controlling an optical path length of said optical path between said two reflective elements according to the measured pulse repetition rate to control said pulse repetition rate at a desired pulse repetition rate.

13. The method as in claim 12, where said desired pulse repetition rate is obtained from a master clock signal, said method further comprising:

comparing the measured pulse repetition rate to said desired pulse repetition rate to determine a difference; and using a feedback control loop to adjust said optical path length to reduce said difference.

14. The method as in claim 12, further comprising:

engaging a fiber stretcher to said fiber gain medium for controlling said optical path length of said optical path; and using said fiber stretcher to adjust said optical path length to control said pulse repetition rate of said optical pulses.

15. The method as in claim 12, further comprising:

engaging a positioner to one reflective element to change and control a position of said one reflective element for controlling said optical path length of said optical path; and using said positioner to adjust said optical path length to control said pulse repetition rate of said optical pulses.

16. The method as in claim 12, further comprising:

placing a wavelength-tuning element in said optical path linking said two reflective optical elements; and adjusting said wavelength-tuning element to adjust a wavelength of said optical pulses within a gain spectral range of said fiber gain medium.

17. The method as in claim 16, wherein said wavelength-tuning element includes a tunable grating.

18. The method as in claim 16, wherein said wavelength-tuning element includes a tunable bandpass filter.

19. A method, comprising:

forming an optical resonator by using two reflective elements;

disposing a fiber gain medium between said two reflective elements to provide an optical gain within a gain spectral range, wherein said fiber gain medium is formed of a polarization-maintaining fiber;

using a saturable absorber in said resonator to lock multiple resonator modes to produce optical pulses, wherein said satuarable absorber has a slow saturation process with a low saturation intensity and a fast saturation process with a high saturation intensity;

coupling a pump beam into said resonator at a location between said saturable absorber and said fiber gain medium to direct said pump beam towards said fiber gain medium and to excite said fiber gain medium;

optically detecting a portion of energy of said optical pulses to measure a pulse repetition rate of said optical pulses; and during normal mode-locking operation, controlling an optical path length of said optical path between said two reflective elements according to the measured pulse repetition rate to control said pulse repetition rate at a desired pulse repetition rate.

20. The method as in claim 19, further comprising:

placing a wavelength-tuning element in said optical resonator; and adjusting said wavelength-tuning element to adjust a wavelength of said optical pulses within said gain spectral range of said fiber gain medium.

* * * * *